(12) United States Patent
Kawano et al.

(10) Patent No.: US 7,956,575 B2
(45) Date of Patent: Jun. 7, 2011

(54) CHARGING DEVICE FOR BATTERY

(75) Inventors: Yoshikazu Kawano, Hitachinaka (JP);
Nobuhiro Takano, Hitachinaka (JP);
Shinji Watanabe, Hitachinaka (JP);
Hiroyuki Hanawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 682 days.

(21) Appl. No.: 11/740,464

(22) Filed: Apr. 26, 2007

(65) Prior Publication Data

US 2007/0252558 A1 Nov. 1, 2007

(30) Foreign Application Priority Data

Apr. 28, 2006 (JP) ................ P2006-126230

(51) Int. Cl.
*H01J 7/00* (2006.01)
*H01J 7/04* (2006.01)
(52) U.S. Cl. ........ 320/113; 320/106; 320/112; 320/115
(58) Field of Classification Search ............ 320/107, 320/106, 112, 113, 114, 115, 132, 134, 135, 320/136, 123
See application file for complete search history.

(56) References Cited

U.S. PATENT DOCUMENTS

| | | | |
|---|---|---|---|
| 6,118,249 A * | 9/2000 | Brockmann et al. | 320/108 |
| 6,157,162 A * | 12/2000 | Hayashi et al. | 320/104 |
| 2004/0070369 A1* | 4/2004 | Sakakibara | 320/128 |
| 2006/0071632 A1* | 4/2006 | Ghabra et al. | 320/108 |
| 2006/0103357 A1* | 5/2006 | Johnson et al. | 320/150 |
| 2006/0186860 A1* | 8/2006 | Mori | 320/150 |
| 2007/0069687 A1* | 3/2007 | Suzuki | 320/108 |
| 2007/0069691 A1* | 3/2007 | Fukuda | 320/128 |
| 2008/0094027 A1* | 4/2008 | Cho | 320/108 |

FOREIGN PATENT DOCUMENTS

| | | |
|---|---|---|
| JP | 62-193518 | 8/1987 |
| JP | 02-246739 | 10/1990 |
| JP | 02269418 | 11/1990 |
| JP | 3-34638 | 4/1991 |
| JP | 05-219655 | 8/1993 |
| JP | 10-019818 | 1/1998 |
| JP | 11-069646 | 3/1999 |
| JP | 2000-058138 | 2/2000 |
| JP | 2000-134808 | 5/2000 |
| KR | 10-0554889 | 2/2006 |
| WO | WO 2006/101285 A1 | 9/2006 |

OTHER PUBLICATIONS

Japanese Notification of Reasons for Refusal, w/ English translation thereof, issued in Japanese Patent Application No. JP 2006-126230 dated Oct. 6, 2009.
Chinese Office Action, with English translation, issued in Chinese Patent Application No. 200710097303.X, mailed Mar. 26, 2010.

* cited by examiner

*Primary Examiner* — Edward Tso
*Assistant Examiner* — Alexis Boateng
(74) *Attorney, Agent, or Firm* — McDermott Will & Emery LLP

(57) ABSTRACT

Abnormal detecting means 112 for detecting that an electrically conductive foreign substance has migrated into a charging device 1 is provided, and whether or the foreign substance has migrated is judged from the detection result of the abnormal detecting means 112.

9 Claims, 7 Drawing Sheets

FIG. 7

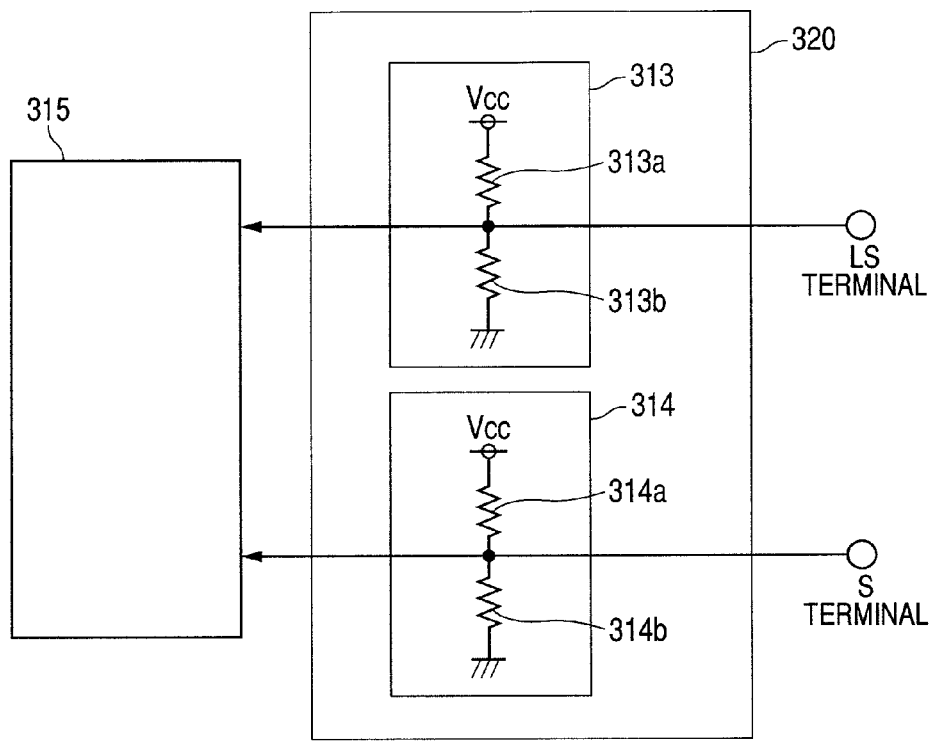

FIG. 8

|  | OUTPUT OF FIRST TEMPERATURE DETECTING CIRCUIT 313 | OUTPUT OF SECOND TEMPERATURE DETECTING CIRCUIT 314 | STATE |
|---|---|---|---|
| NO BATTERY PACK CONNECTED | CONSTANT (NO CHANGE) | CONSTANT (NO CHANGE) | NORMAL |
| FIRST BATTERY PACK CONNECTED | CHANGE | CONSTANT (NO CHANGE) | NORMAL |
| SECOND BATTERY PACK CONNECTED | CONSTANT (NO CHANGE) | CHANGE | NORMAL |
| CONTACT WITH FOREIGN SUBSTANCE | CHANGE | CHANGE | ABNORMAL |

CHARGING DEVICE FOR BATTERY

CROSS-REFERENCE TO RELATED APPLICATIONS

This application is based on and claims the benefit of priority from the prior Japanese Patent Application No. 2006-126230, filed on Apr. 28, 2006; the entire contents of which are incorporated herein by reference.

BACKGROUND

Technical Field

The present invention relates to a charging device for charging a nickel-cadmium battery (as will be called the "Ni—Cd battery"), a nickel-metal hydride battery (hereinafter, referred to as "Ni-MH battery") or a lithium ion battery (hereinafter, referred to as "Li-ion battery"), which is used as a power source for a portable device such as a cordless electric tool or the like.

In recent years, the Ni—Cd battery, the Ni-MH battery or the Li-ion battery is used as the power source for the mobile device such as the cordless electric tool or the like. The charging device for charging those batteries is often used outdoors, and rain droplets or metal chips may migrate into the charging device through a cooling wind opening formed in the charging device or through an opening such as the battery connecting portion. In case the electrically conductive foreign substance migrates into the charging device or comes into contact with the connection terminals of the battery arranged in the battery connecting portion, the internal electric circuit may be shorted to troubles. For these countermeasures, there is a charging device, which has its circuit protected against the electrically conductive foreign substance by filling its inside with a resin.

SUMMARY

However, the charging device described above can prevent the electric circuit from being shorted by the migration of the electrically conductive foreign substance, but the charging device having failed to have its connecting portions protected by a cover or the like is shorted between the charging terminals. An object of the invention is to eliminate the defects of the prior art thus far described, and to protect the electric circuit of the charging device even in case the electrically conductive foreign substance migrates.

The aforementioned object is achieved by a charging device for charging a battery having a plurality of cells connected in series. In the charging device, abnormal detecting means for detecting that an electrically conductive foreign substance has migrated into the charging device is provided, and whether or the foreign substance has migrated is judged from the detection result of the abnormal detecting means. When it is judged that the foreign substance has migrated, the charge is stopped, and the abnormal state is informed by abnormal display means.

It is possible to prevent the trouble such as the short-circuit in advance when the electrically conductive foreign substance migrates into the charging device or comes into contact between the battery connection terminals.

BRIEF DESCRIPTION OF THE DRAWINGS

FIG. 7 is a partial circuit block diagram showing another mode of the charging device according to the embodiment.

FIG. 8 is a state diagram of another mode of the charging device according to the embodiment.

DESCRIPTION OF THE EMBODIMENTS

Figure 1:
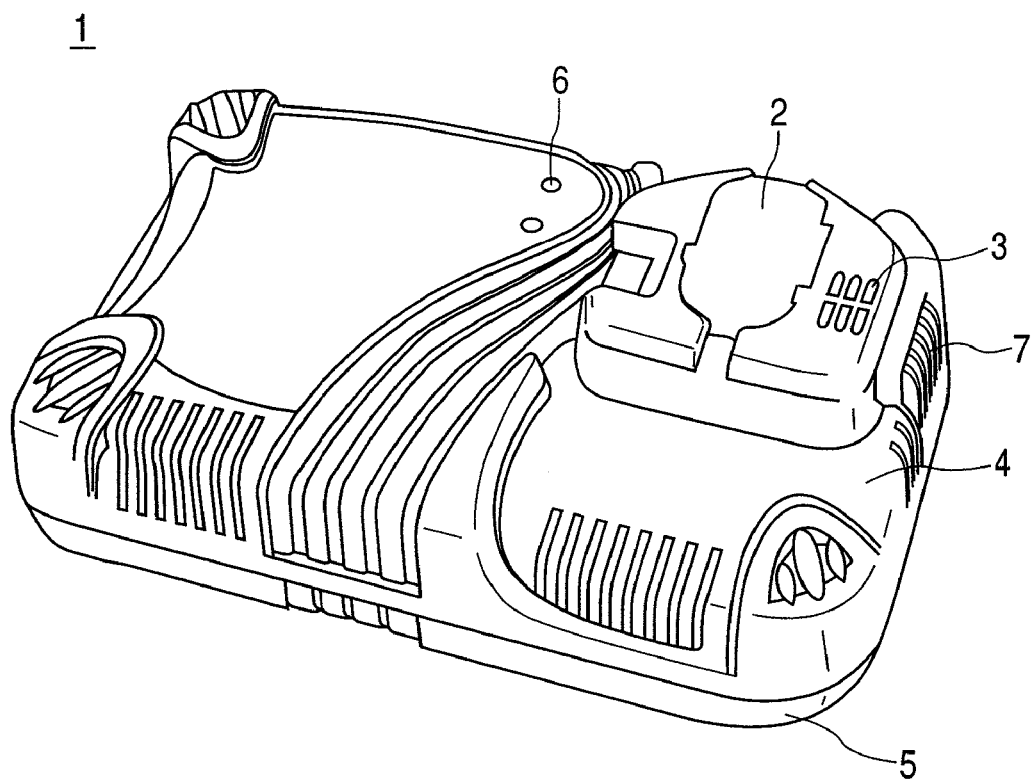
FIG. 1 is a perspective view showing a charging device according to an embodiment of the invention.

Modes of embodiment of the invention are described in detail with reference to the accompanying drawings. The charging device 1 is composed of an upper case 4 and a lower case 5, and is provided with: a plug-in port 2, into which a bayonet portion 102a of a battery pack 102 is inserted when the battery pack 102 is charged; an intake port 7 for introducing the air into the charging device 1 by a cooling fan arranged in the charging device 1; a vent port 3 for feeding the air introduced, to a draft port 102b of the battery pack 102; and a display unit 6 made of an LED for displaying the charging state or the like of the charging device 1. Moreover, the battery pack 102 is provided, at the leading end of its bayonet portion 102a of the battery pack 102, with: a terminal 102c to be electrically connected with the terminal on the side of the charging device 1; and the not-shown discharge port for discharging the cooling wind coming in from the draft port 102b. Here, this mode of embodiment is described on the example of the plug-in type charging device, but the invention can also be applied to a slide type charging device.

Figure 3:
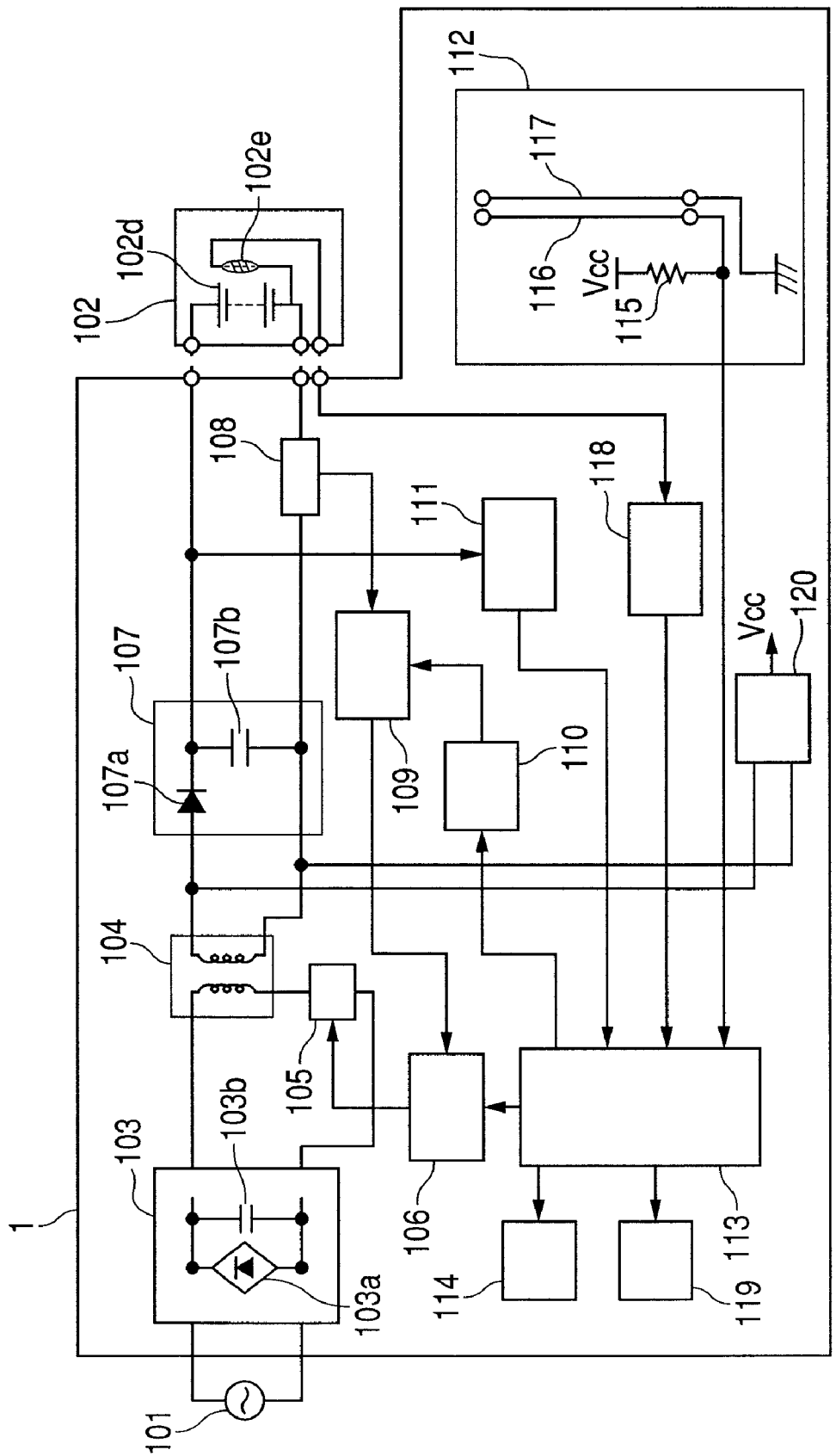
FIG. 3 is a circuit block diagram showing the charging device according to the embodiment.

Next, one mode of embodiment of the charging circuit of the charging device 1 is described with reference to FIG. 3. In FIG. 3, the battery pack 102 to be charged by the charging device 1 is composed of: a plurality of chargeable cells connected in series; and a temperature sensing element 102e arranged in contact with or in proximity of the element battery 102d for functioning as a temperature detecting sensor such as a thermistor so as to detect the temperature in the battery pack 102.

A first rectifying smooth circuit 103 is composed of a full-wave rectifying circuit 103a and a smoothing condenser 103b, and rectifies the full wave of an AC power source 101. A switching element 105 is made of an FET or the like and connected with the primary coil of a high-frequency transformer 104. On the basis of a charging current control signal from the later-described constant-current control circuit 109, a switching control circuit 106 varies the drive pulse width of the switching element 105, to control the ON time of the switching element 105 thereby to adjust the output voltage of a second rectifying smooth circuit 107 and the charging current to the battery pack 102. In response to an output signal from a microcomputer 113 (as will be called the "micom"), moreover, the switching control circuit 106 controls the ON/OFF of the switching element 105 thereby to control the start and stop of the charge of the battery pack 102. The second rectifying smooth circuit 107 is composed of a diode 107a and a smoothing condenser 107b, which are connected with the secondary coil of the high-frequency transformer 104.

The charging current to flow in the battery pack 102 is detected by a charging current detecting circuit 108 made of a resistor, for example, and the detected signal is outputted to a constant-current control circuit 109 composed of a functional amplifier or the like. Moreover, the constant-current control circuit 109 is fed with a current set value from a current setting circuit 110, which sets a reference voltage corresponding to a charging current of the battery pack 102, i.e., a predetermined current value in response to the output of the micom 113. The constant-current control circuit 109 outputs a current control signal to the switching control circuit 106 so that the charging current detected by the charging current detecting circuit 108 may be a predetermined current value set by the current setting circuit 110. On the basis of this control signal, the switching control circuit 106 varies the drive pulse width of the switching element 105, to adjust the ON time of the switching element 105 thereby to control the charging current to a set value. Here, the charging current detecting circuit 108, the constant-current control circuit 109 and the current setting circuit 110 constitute a charging current control unit.

The battery voltage of the battery pack 102 is detected by a battery voltage detecting circuit 111 composed of a resistor, so that the voltage (or the detected voltage) divided by that resistor is inputted to the micom 113.

A battery temperature detecting circuit 118 is composed of a resistor, and is connected with the temperature sensing element 102e of the battery pack 102, so that the battery temperature detecting circuit 118 has its divided voltage value varied on the basis of the variation of the temperature signal from the temperature sensing element 102e of the thermistor or the like having its resistance varied according to the temperature, thereby to output the divided voltage signal to the micom 113.

Figure 2:
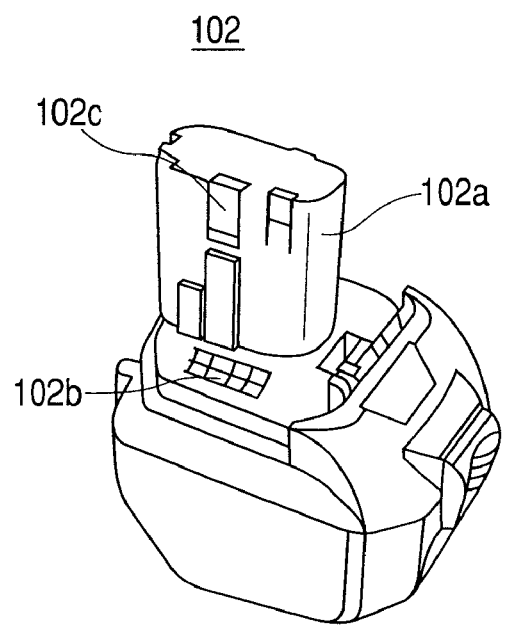
FIG. 2 is a perspective view showing a battery pack which can be recharged by the charging device according to the embodiment.

The state of the charging device 1 is displayed in the display unit 6 (as referred to FIG. 1) by a display circuit 114 composed of a plurality of LEDs, for example, so that the recharged state, the fully charged state, the abnormal state and so on are displayed by the combination of lights and flashes of the LEDs. Here, the indication of the state of the charging device 1 should not be limited to the display but may be informed to the user with the sound according to the charged state. A cooling fan 119 is provided for cooling the charging device 1 and the battery pack 102 by sucking the air from the intake port 7, as shown in FIG. 1 and FIG. 2, and by discharging the air from the not-shown discharge port through the vent port 3 and the draft port 102b. A constant-voltage circuit 120 generates a drive power source Vcc such as 5V for the micom 113, the constant-current control circuit 109, the battery temperature detecting circuit 118, an abnormal detecting circuit 112, the cooling fan 119 and so on.

Figure 4:
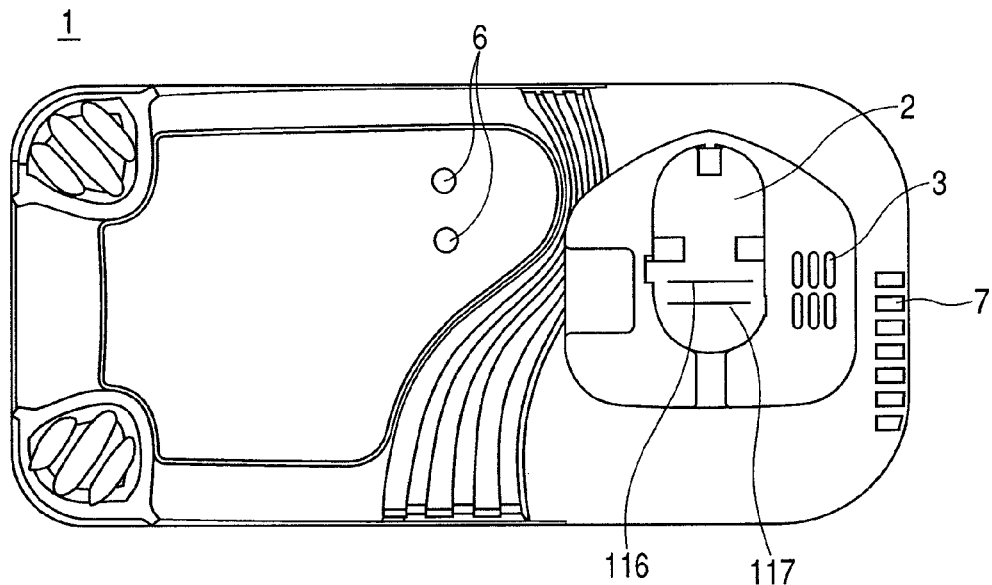
FIG. 4 is an arrangement diagram of an abnormal detecting circuit showing the charging device according to the embodiment.

The abnormal detecting circuit 112 is composed of a resistor 115 and electrically conductive jumper lines 116 and 117. Usually, the micom 113 is fed with an input of 5 V through the resistor 115. In case, however, a conducting foreign substance such as a metal chip migrates into the charging device 1 so that the jumper lines 116 and 117 are shorted at an arbitrary resistance with the foreign substance or a rain drop, the voltage of 5 V is divided by the resistor 5 and the jumping lines 116 and 117. As a result, the voltage to be inputted to the micom 113 is dropped at that division ratio so that a voltage of about 0 V is inputted to the micom 113 if the jumper lines 116 and 117 have a small internal resistance, for example. Therefore, the micom 113 can judge that the electrically conductive foreign substance has migrated. Here, the jumper lines 116 and 117 have to be disposed in the place where the foreign substance easily migrates or where the migration of the foreign substance easily troubles the circuit. As shown in FIG. 4, for example, the plug-in port 2, into which the battery pack 102 of the charging device 1 is to be inserted, is opened for receiving the bayonet portion 102a of the battery pack 102 so that it never fails to accept the foreign substance. Moreover, the plug-in port 2 is equipped with a charge terminal or a temperature terminal, which is to be electrically connected with the terminal 102c disposed at the bayonet portion 102a of the battery pack 102, and the electrically conductive foreign substance may migrate into the plug-in port 2 thereby to short the terminals. By equipping the plug-in port 2 with the jumper lines 116 and 117, therefore, it is possible to prevent the charging circuit from being shorted by the foreign substance. Moreover, the user is informed of the migration, if any, of the foreign substance by the display circuit 114 so that the user can easily notice that migration. Here, the charging device 1 can be easily cleared of the foreign substance, if the upper case 4 and the lower case 5 are jointed by means of screws, as shown in FIG. 1.

Figure 5:
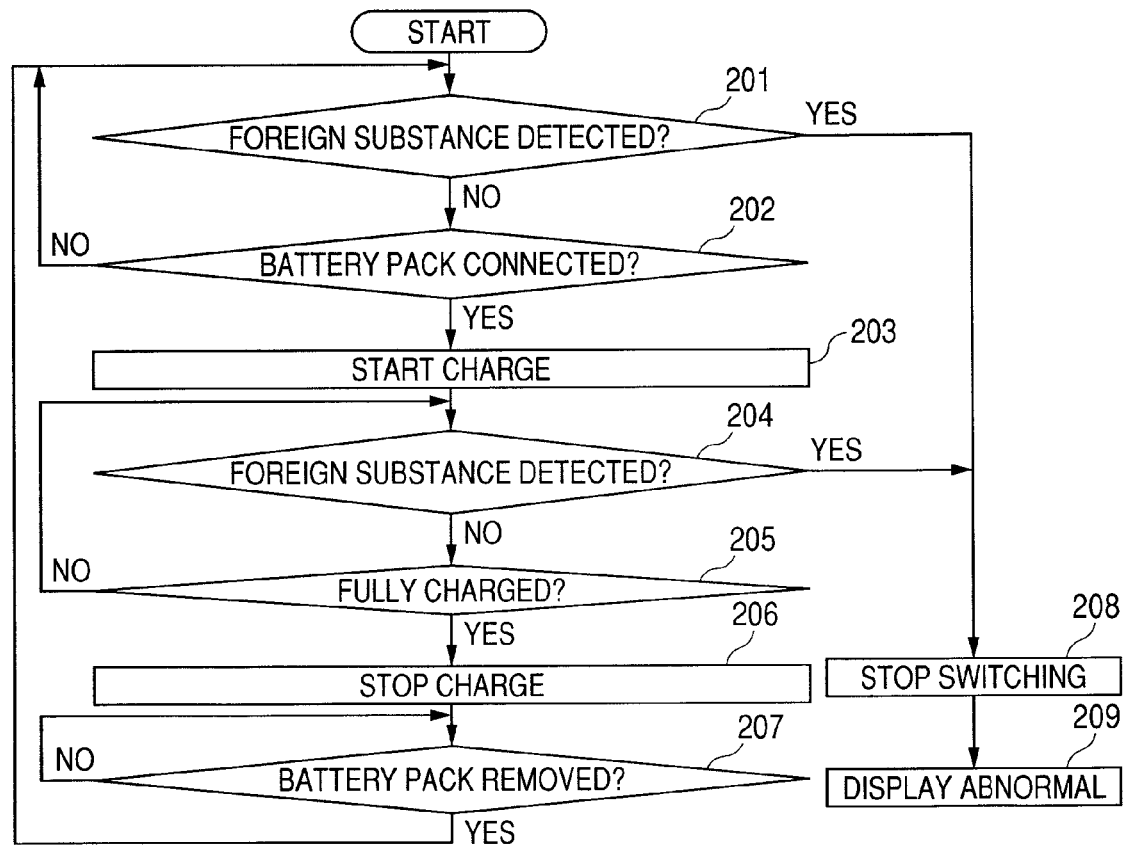
FIG. 5 is a flow chart showing the charging device according to the embodiment.

Next, the actions of the charging device 1 are described with reference to FIG. 3 and FIG. 5. When the charging device 1 is connected with the AC power source 101, the micom 113 monitors (at Step 201) the voltage from the abnormal detecting circuit 112 at all times. When the micom 113 detects the electrically conductive foreign substance, that is, the voltage divided from 5 V by the resistor 115 and the jumper lines 116 and 117, in case the input to the micom 113 is not 5 V, such as 0 V in case the internal resistances of the jumper lines 116 and 117 are low, is detected, the micom 113 judges that the foreign substance has migrated (i.e., the answer of Step 201: Yes). The micom 113 outputs an instruction signal for turning OFF the switching element 105 to the switching control circuit 106. In response to the switching stop signal from the switching control circuit 106, the switching element 105 stops (at Step 208) the switching action so that the charging device 1 does not start the charge of the battery pack 102 but the display circuit 114 informs (at Step 209) the user of the abnormal state, i.e., the foreign substance migration.

In case the micom 113 judges that the foreign substance is not detected, that is, in case the input from the abnormal detecting circuit 112 to the micom 113 is 5 V (i.e., the answer of Step 201: No), the micom 113 waits (i.e., the answer of Step 202: No) till the battery pack 102 is connected. The connection of the battery pack 102 can be detected by the temperature detecting circuit 118 or the battery voltage detecting circuit 111. When the battery pack 102 is connected with the charging device 1 (i.e., the answer of Step 202: Yes), the micom 113 outputs a reference voltage corresponding to a preset charging current to the current setting circuit 110, and the charge starting signal to the switching control circuit 106, thereby to turn ON the switching element 105 to start the charge (at Step 203).

The charge of the battery pack 102 is performed by the constant-current control in case the battery pack 102 connected is exemplified by a Ni—Cd battery pack or a Ni-MH battery pack. In the system of the constant-current control, both the charging current (or the voltage corresponding to the charging current), which is detected from the charging current to flow through the battery pack 102 simultaneously with the charge start by the charging current detecting circuit 108, and the reference voltage corresponding to the predetermined current value set in the current setting circuit 110 are outputted to the constant-current control circuit 109. A feedback is so made on the switching control circuit 106 by the constant-current control circuit 109 that those voltages may coincide with each other, namely, that the charging current may take a predetermined current value, and the drive pulse width of the switching element 105 is controlled to keep the charging current constant. Here, a plurality of charging current values can be set by the current setting circuit 110, and the charging current may be varied by the battery temperature or the like.

After this, the micom 113 judges it at Step 204 on the basis of the voltage signal from the abnormal detecting circuit 112 by the micom 113 whether or not the foreign substance has migrated during the charging operation. In case the micom 113 judges the migration of the foreign substance (the answer of Step 204: Yes), the micom 113 outputs an instruction signal for turning OFF the switching element 105, to the switching control circuit 106. In response to the switching stop signal from the switching control circuit 106, the switching element 105 stops (at Step 208) the switching action and the charge, and informs (at Step 209) the user of the abnormal state with the display circuit 114.

In case it is judged that no foreign substance has been detected, on the other hand, the routine advances to Step 205 to perform the detection of the full charge. For detecting the full charge, various methods are known in the art. One or more of the following full charge detecting methods may be adopted. In the $-\Delta$ detection method, the charge is controlled by detecting it on the basis of the output of the battery voltage detecting circuit 111 that the battery voltage has dropped in a predetermined quantity from the peak voltage at the charge terminal time. In the second order differential detection method, the charge is controlled by detecting that the second order differential value of the battery voltage with the time becomes negative. In the $\Delta T$ detection method, the charge is controlled by detecting the battery temperature on the basis of the output of the battery temperature detecting circuit 118 thereby to detect that the temperature rise of the battery from the charge start becomes a predetermined value or higher. In the $\Delta T/\Delta t$ detection method, the charge is controlled by detecting the instant, at which the battery temperature rising rate (or the temperature gradient) per a predetermined time at the charging time, as described in JP-A-62-193518, JP-A-2-246739, JP-UM-3-34638 or the like.

In case the battery pack 102 is not fully charged at Step 205 (the answer of Step 205: No), the routine returns to Step 204, at which the foreign substance is detected. If it is judged (the answer of Step 205: Yes) that the battery pack 102 is fully charged, the micom 113 stops (at Step 206) the charge by outputting a charge stopping signal to the switching control circuit 106 thereby to turn OFF the switching element 105. Next, it is judged (at Step 207) that the battery pack 102 is removed from the charging device 1. When it is judged (the answer of Step 207: Yes) that the battery pack 102 has been removed, the routine returns to Step 201.

Next a second mode of embodiment is described with reference to FIG. 6 to FIG. 10. The charging device shown in FIG. 6 is a general-purpose charging device, which can charge battery packs of different kinds.

Figure 9:
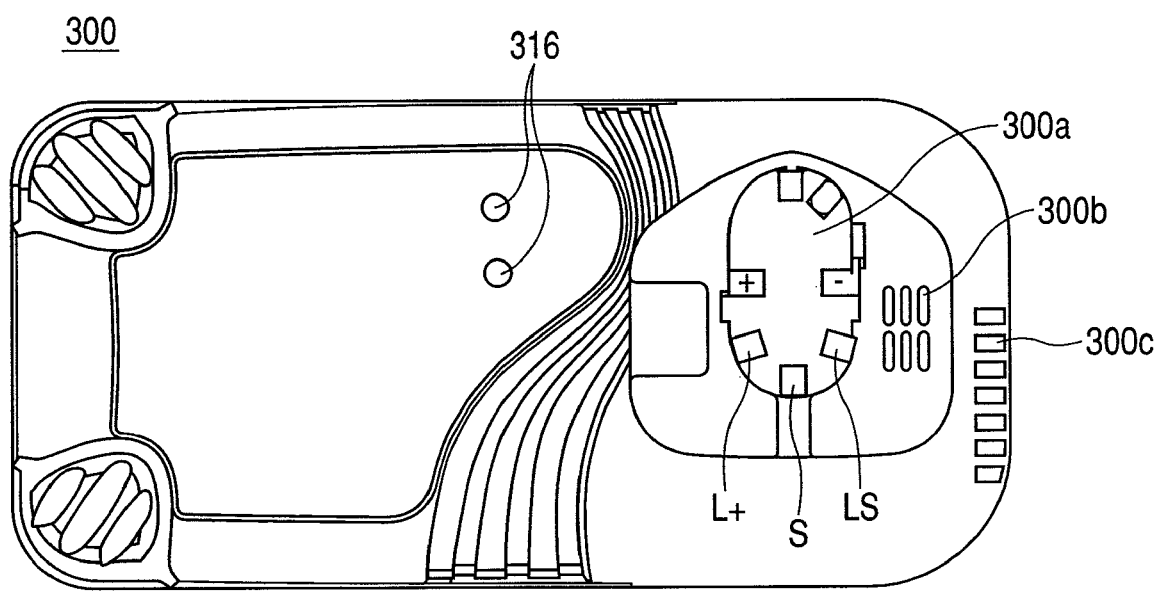
FIG. 9 is a perspective view showing another mode of the charging device according to the embodiment.
Figure 10:
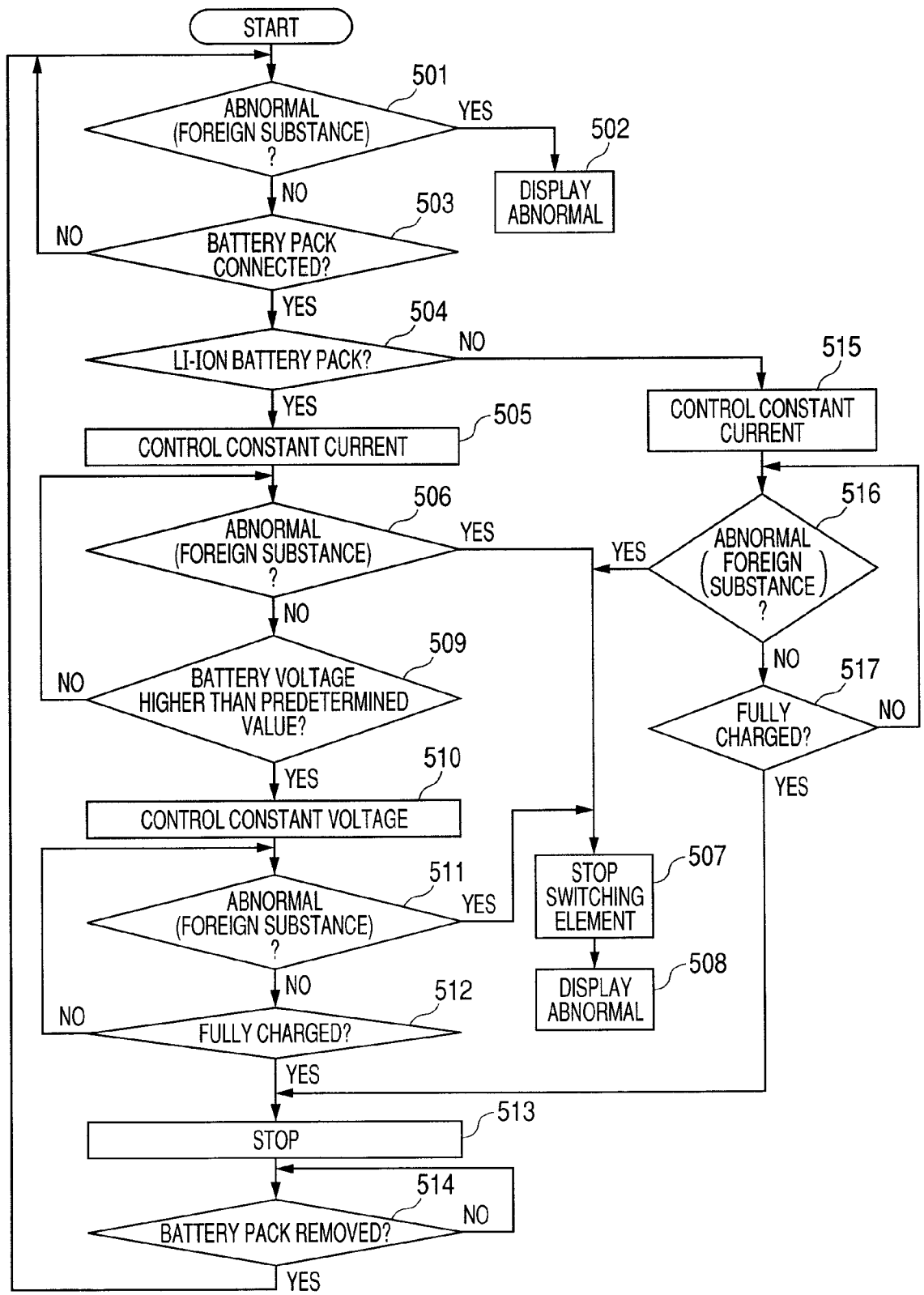
FIG. 10 is a flow chart showing another mode of the charging device according to the embodiment.

A charging device 300 can charge battery packs 301 of different kinds. The battery pack 301 is composed of a plurality of cells 301a connected in series, a temperature sensing element 301b arranged in contact with or in proximity of the cells 301a for detecting the temperature in the battery pack 301 and functioning as a temperature detecting sensor such as a thermistor. Here, the temperature sensing element 301b has different terminal positions, at which it is connected with the charging device 300, according to the kind of the battery pack 301. The charging device 300 can discriminate the kind of the battery pack 301 connected, in dependence upon what terminal the temperature sensing element 301b is connected with. Here, the temperature sensing element 301b has different terminal positions to be connected with the charging device 300, in accordance with the kind of the battery pack 301. In accordance with which terminal the temperature sensing element 301b is connected with, the charging device 300 can discriminate the kind of the battery pack 301 connected. Moreover, not the terminal positions of the temperature sensing element 301b but the positions of the plus terminals, or the positions of both the temperature sensing element 301b and the plus terminals are made different according to the kinds of the battery pack, and the charging device 300 is provided with the terminals to be connected with the individual terminals of those battery packs, as shown in FIG. 9. In FIG. 9: the L+ terminal is connected with the plus terminal of the battery pack of the first kind; the + terminal with the plus terminal of the battery pack of the second kind; the LS terminal with the temperature sensing element terminal of the battery pack of the first kind; the S terminal with the temperature sensing element terminal of the battery pack of the second kind; and the – terminal with the minus terminals of the battery packs of the first kind and the second kind. Moreover, the charging device 300 is provided, like the charging device 1, with: a plug-in port 300a, into which the bayonet portion 300a of the battery pack is inserted; an intake port 300c for introducing the air into the charging device 300 by the later-described cooling fan; a vent port 300b for feeding the air introduced, to the battery pack 301; and the later-described display unit 316 for displaying the charged state or the like of the charging device 300.

Figure 6:
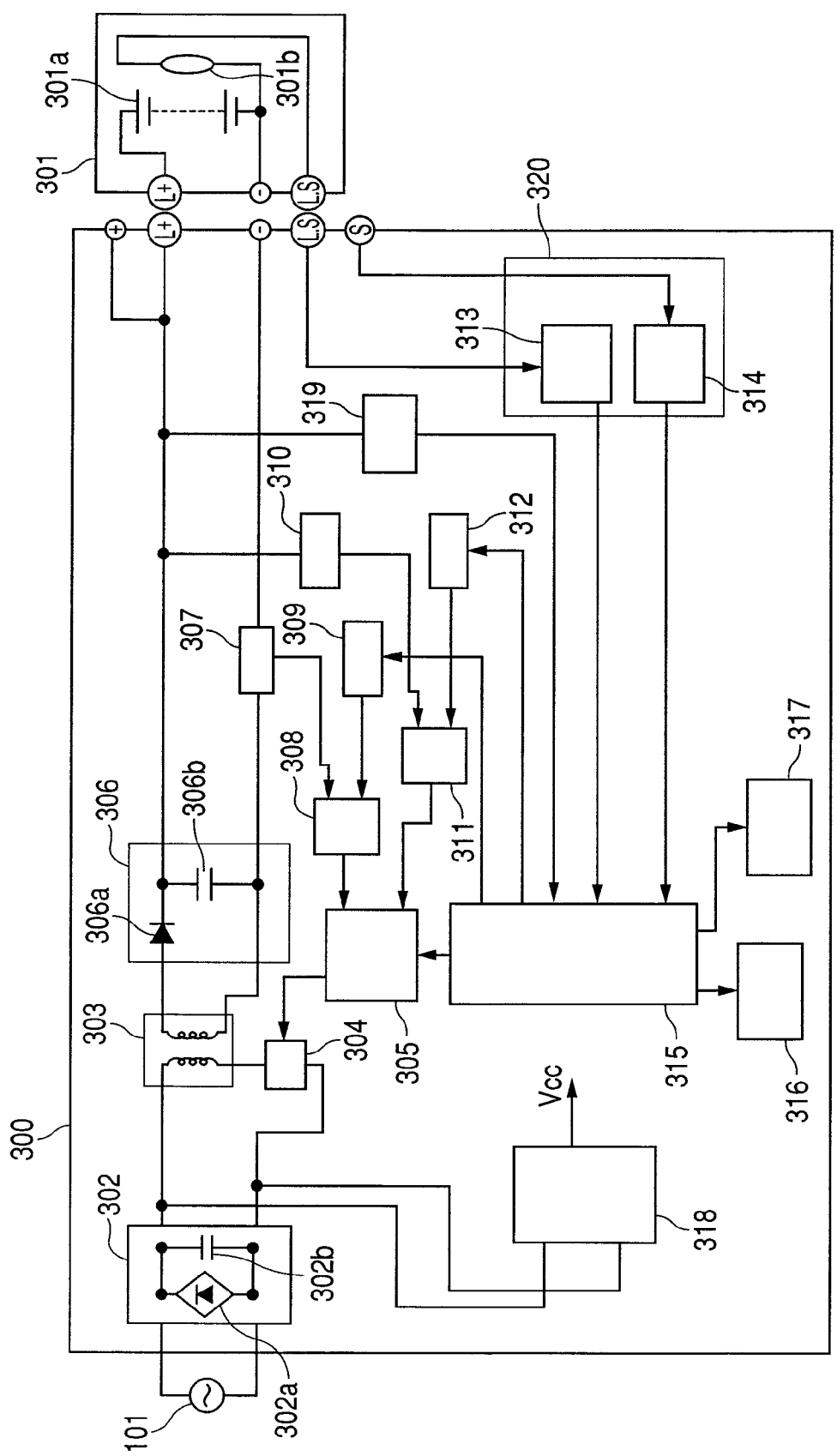
FIG. 6 is a circuit block diagram showing another mode of the charging device according to the embodiment.

In FIG. 6, the first rectifying smooth circuit 302 is composed of a full-wave rectifying circuit 302a and a smoothing condenser 302b, and rectifies the full wave of the AC power source 101. A switching element 304 is made of an FET or the like and connected with the primary coil of a high-frequency transformer 303. On the basis of a charging current control signal from the later-described constant-current control circuit 308, a switching control circuit 305 varies the drive pulse width of the switching element 304, to control the ON time of the switching element 304 thereby to adjust the output voltage of a second rectifying smooth circuit 306 and the charging current to the battery pack 301. In response to an output signal from a microcomputer 315, moreover, the switching control circuit 305 controls the ON/OFF of the switching element 304 thereby to control the start and stop of the charge of the battery pack 301. The second rectifying smooth circuit 306 is composed of a diode 306a and a smoothing condenser 306b, which are connected with the secondary coil of the high-frequency transformer 303.

The charging current to flow in the battery pack 301 is detected by a charging current detecting circuit 307 made of a resistor, for example, and the detected signal is outputted to a constant-current control circuit 308 composed of a functional amplifier or the like. Moreover, the constant-current control circuit 308 is fed with a current set value from a current setting circuit 309, which sets a reference voltage corresponding to a charging current of the battery pack 301, i.e., a predetermined current value in response to the output of the micom 315. The constant-current control circuit 308 outputs a current control signal to the switching control circuit 305 so that the charging current detected by the charging current detecting circuit 307 may be a predetermined current value set by the current setting circuit 309. On the basis of this control signal, the switching control circuit 305 varies the drive pulse width of the switching element 304, to adjust the ON time of the switching element 304 thereby to control the charging current to a set value. Here, the charging current detecting circuit 307, the constant-current control circuit 308 and the current setting circuit 309 constitute a charging current control unit.

The battery voltage of the battery pack 301 is detected by a battery voltage detecting circuit 319 composed of a resistor, so that the detected voltage (or the divided voltage by the resistor) is inputted to the micom 315.

The output voltage of the second rectifying smooth circuit 306 is detected by an output voltage detecting circuit 310 made of a resistor, and is outputted to an output voltage control circuit 311 composed of a functional amplifier or the like. Moreover, the output voltage control circuit 311 is fed with a voltage set value from an output voltage setting circuit 312, which sets a predetermined output voltage corresponding to the battery pack 301 in response to the output of the micom 315. The output voltage control circuit 311 outputs a voltage control signal to the switching control circuit 305, as in the constant-current control circuit 308, so that the output voltage of the second rectifying smooth circuit 306 detected by the output voltage detecting circuit 310 may be a predetermined voltage value set by the output voltage setting circuit 312. On the basis of this control signal, the switching control circuit 305 varies the drive pulse width of the switching element 304, to adjust the ON time of the switching element 304 thereby to control the output voltage of the second rectifying smooth circuit 306 to a set value. Here, the output voltage detecting circuit 310, the output voltage control circuit 311 and the output voltage setting circuit 312 constitute an output voltage control unit.

A first battery temperature detecting circuit 313 is made of a resistor, and is connected with that temperature sensing element 301b of the battery pack 301, which has its resistance varied according to the battery temperature. This battery temperature is detected with the change in the voltage (or the voltage division ratio), which is divided from the voltage Vcc with the resistance values of that resistor and the temperature sensing element 301b, so that the detected signal is outputted to the micom 315. A second battery temperature detecting circuit 314 is also composed of a resistor, and is connected with a temperature sensing element in a battery pack 301' of a second kind different from the first kind of the battery pack 301 thereby to have a function similar to the aforementioned one, when the battery pack 301' of the second kind is connected with the charging device 300. Here in FIG. 6, a second battery temperature detecting circuit 314 is not connected with the first battery pack 301, and the first battery temperature detecting circuit 313 is not connected either with the battery pack 301' of the kind different from that of the battery pack 301. Therefore, the kind of the battery pack to be connected can be discriminated by the first and second battery temperature detecting circuits 313 and 314.

The state of the charging device 300 is displayed by the display circuit 316 composed of a plurality of LEDs, for example, so that the recharged state, the fully charged state, the abnormal state and so on are displayed by the combination of lights and flashes of the LEDs. Here, the indication of the state should not be limited to the display but may be informed with the sound according to the charged state. A cooling fan 317 is provided for cooling the charging device 300 and the battery pack 301, and sucks the air from the intake port 300c and feeds the cold wind into the battery pack through the vent port 300b.

A constant-voltage circuit 318 is provided as a system different from the charging channel of the battery pack 301, and generates the drive power source Vcc such as 5 V for the micom 315, the constant-current control unit, battery temperature detecting circuits 313 and 314, the cooling fan 317 and so on. Here, the constant-voltage circuit 318 is disposed as a channel different from the charging channel, feeds the drive power source Vcc to the micom 315, and the output voltage control unit and so on. In case, therefore, the battery pack 301 is not connected with the charging device 300, the charging channel can be broken to reduce the power consumption.

An abnormal detecting circuit 320 of this embodiment is constituted of the first and second battery temperature detecting circuits 313 and 314, and is described with reference to FIG. 7 and FIG. 8.

The first battery temperature detecting circuit 313 divides the voltage Vcc such as 5 V fed by the constant-voltage circuit 318, with voltage dividing resistors 313a and 313b, and outputs the divided voltage to the micom 315. Likewise, the battery temperature detecting circuit 314 divides the voltage Vcc with voltage dividing resistors 314a and 314b, and outputs the divided voltage to the micom 315. In case the battery pack is not connected, the divided voltages of the first and second battery temperature detecting circuits 313 and 314 are constant (not varied) so that the micom 315 can judge that the battery pack is not connected. In this embodiment, the battery pack 301 of the first kind such as a Li-ion battery pack is normally connected, the temperature sensing element 301b of the battery pack 301 is connected with the first battery temperature detecting circuit 313, so that the output voltage to the micom 315 takes the value which is divided from 5 V by a resistance of a resistor 313a and a synthetic resistance of both a resistor 313b and the temperature sensing element 301b. Moreover, the battery pack 301 (or the temperature sensing element 301b) is not connected with the second battery temperature detecting circuit 314, so that the output to the micom 315 is not changed from that before the connection with the battery pack 301 but is constant. Therefore, the micom 315 judges that the battery pack 301 of the first kind is connected, so that the charge can be performed by the charge control of the battery pack 301 of the first kind, i.e., the Li-ion battery pack.

When the battery pack 301' of the second kind such as a Ni-MH battery pack is connected, on the other hand, it is connected with not the first battery temperature detecting circuit 313 but the second battery temperature detecting circuit 314, because the terminal of the temperature sensing element is positioned at a position different from that of the battery pack 301 of the first kind. Therefore, the output voltage from the first battery temperature detecting circuit 313 is not varied from that before the battery pack connection but constant, and the output voltage from the second battery temperature detecting circuit 314 takes the value which is divided from 5 V by a resistance of a resistor 313a and a synthetic resistance of both a resistor 313b and the temperature sensing element 301b. Then, the micom 315 judges that the battery pack 301 of the second kind has been connected, so that the charge can be performed by the charge control of the Ni-MH battery pack. Here, the kind of the battery pack is discriminated with the connection position of the temperature sensing element, but may also be discriminated with the connection position of the plus terminal of the battery pack.

Here, let the case be considered, in which the electrically conductive foreign substance migrates between the first and second battery temperature detecting circuits 313 and 314, that is, in case the short circuit occurs between the temperature terminals (i.e., the LS terminal and the S terminal of FIG. 6) to be connected with the individual temperature sensing elements of the battery packs of the first and second kinds. In the normal case, in which the battery pack is not connected, the output voltages of the first and second battery temperature detecting circuits 313 and 314 take the values, which are divided from 5 V by the individual voltage dividing resistors 313a and 313b, and 314a and 314b, so that a constant voltage is inputted to the micom 315. In case the battery pack of the first or second kind is normally connected, the output voltage of one of the first and second battery temperature detecting circuits 313 and 314 varies, as described hereinbefore. When the first and second battery temperature detecting circuits 313 and 314 are made to contact with each other by the electrically conductive foreign substance, however, the output voltages of both the first and second battery temperature detecting circuits 313 and 314 vary so that the micom 315 can detect the abnormal state of the charging device 300, i.e., the migration of the foreign substance.

The actions of the charging device 300 according to this mode of embodiment are described with reference to FIG. 6 to FIG. 10. When the charging device 300 is connected with the AC power source 101, the drive voltage Vcc is fed to the micom 315 or the like by the constant-voltage circuit 318 so that the micom 315 or the like is started. Here, the power supply to the charging channel is interrupted till the switching element 304 is turned ON.

The micom 315 monitors (at Step 501) at all times the output voltages of the abnormal detecting circuit 320, namely, the first and second battery temperature detecting circuit 313 and 314. In case the output voltages of the first and second battery temperature detecting circuits 313 and 314 vary although the battery pack is not connected, the micom 315 judges (the answer of Step 501: Yes) that the connection terminals LS and S of the first and second battery temperature detecting circuits 313 and 314 are made to contact by the electrically conductive foreign substance, and displays (at Step 502) the abnormal in the display circuit 316 thereby to keep the stop of the power feed to the charging channel.

In the case of no variation in the output voltages of the first and second battery temperature detecting circuits 313 and 314, on the other hand, the micom 315 judges (the answer of Step 501: No) no abnormal contact by the electrically conductive foreign substance, and monitors (at Step 503) the connection of the battery pack. Here, the connection of the battery pack is detected by the first and second battery temperature detecting circuits 313 and 314, as has been described hereinbefore.

When the battery pack is connected (the answer of Step 503: Yes) with the charging device 300, the micom 315 discriminates the kind of the battery pack on the basis of the output voltages of the first and second battery temperature detecting circuits 313 and 314. In case the output voltage from the first battery temperature detecting circuit 313 varies, as described hereinbefore, the micom 315 judges (the answer of Step 504: Yes) the battery pack 301 (i.e., the Li-ion battery pack) of the first kind. In case the output voltage from the second battery temperature detecting circuit 314 varies, the micom 315 judges (the answer of Step 504: No) the battery-pack 301' (i.e., the Ni-MH battery pack or the Ni—Cd battery pack) of the second kind. Then, the micom 315 starts the charge control according to the kind of the battery pack.

In the case of the Li-ion battery pack 301, specifically, the micom 315 outputs the reference voltage corresponding to a preset charging current, to the current setting circuit 309, and the charge starting signal to the switching control circuit 305, so that the switching element 304 is turned ON to start (at Step 505) the charge by the constant-current control.

At this time, in this constant-current control system, the charging current to flow simultaneously with the charge start through the battery pack 301 is detected by the charging current detecting circuit 307, and the switching control circuit 305 is so fed back by the constant-current control circuit 308 on the basis of the voltage corresponding to that charging current and the reference voltage corresponding to the predetermined current value set in the current setting circuit 309, that those voltages may become identical, namely, that the charging current may take a predetermined current value. Thus, the drive pulse width of the switching element 304 is adjusted to control the charging current to a constant value. In order that the charging current value may be set to a plurality of values, the current setting circuit 309 may also be given a plurality of reference values thereby to interchange the charging current in accordance with the battery temperature.

After this, at Step 506, the micom 315 judges the abnormal state during the charging operation on the basis of the output voltage from the abnormal detecting circuit 320 (i.e., the first and second battery temperature detecting circuits 313 and 314). In case it is judged that the foreign substance has migrated (the answer of Step 506: Yes), that is, in case it is detected that the output voltages from the first and second battery temperature detecting circuits 313 and 314 have varied, the micom 315 outputs a command signal to turn OFF the switching element 304, to the switching control circuit 305. In response to the switching stop signal from the switching control circuit 305, the switching element 304 stops the switching action (at Step 507) thereby to stop the charge, and informs the user of the abnormal state (at Step 508) by the display circuit 316.

In the absence of the abnormal state, on the other hand, the routine advances to Step 509, at which the micom 315 detects the voltage of the battery pack 301 with the battery voltage detecting circuit 319. In case the battery voltage reaches a predetermined value (the answer of Step 509: Yes), the charge is continued by restoring the constant-voltage control. For the constant-voltage control, the switching control circuit 305 is so fed back by the output voltage control circuit 311 that the battery voltage detected by the battery voltage detecting circuit 319, i.e., the output voltage detected by the output voltage detecting circuit 310, and the reference voltage value set by the voltage setting circuit 312 may be identical. Thus, the output voltage is controlled to a constant value by controlling the driving pulse width of the switching element 304.

After this, at Step 511, as at Step 506, the micom 315 judges the abnormal state during the charging operation on the basis of the output voltage from the abnormal detecting circuit 320 (i.e., the first and second battery temperature detecting circuits 313 and 314). In case it is judged that the foreign substance has migrated (the answer of Step 511: Yes), the micom 315 outputs a command signal to turn OFF the switching element 304, to the switching control circuit 305. In response to the switching stop signal from the switching control circuit 305, the switching element 304 stops the switching action (at Step 507) thereby to stop the charge, and informs the user of the abnormal state (at Step 508) by the display circuit 316.

In case no abnormal state is judged at Step 511, the routine advances to Step 512 to perform a full-charge detecting operation. Here, the full charge is judged in case the charging current is or lower than the preset current value for the full charge, because the charging current gradually drops in the constant-voltage control. In case the full charge is not judged at Step 512, the routine returns to Step 511. In case the full charge is judged, the micom 315 outputs the charge stopping signal to the switching control circuit 305 to turn OFF the switching element 304 thereby to stop the charge (at Step 513). In short, the power feed to the charging channel is interrupted. Next, it is judged (at Step 514) whether or not the battery pack 301 has been removed from the charging device 300. In case the battery pack has been removed, the routine returns to Step 501.

At Step 504, on the other hand, the battery pack connected with the charging device 300 is not the Li-ion battery pack 301 but the battery pack 301' of the second kind such as the Ni-MH battery pack. In this case, the routine advances to Step 515, at which the charge is started by the constant-current control. This constant-current control is performed as at Step 505. Here, the connection of the battery pack 301' is judged from that not the output voltage of the first battery temperature detecting circuit 313 but the output voltage of the second battery temperature detecting circuit 314 varies.

After this, the abnormal state is detected at Step 516. In case the output voltages of the first and second battery temperature detecting circuit 313 and 314 vary, it is judged that some electrically conductive foreign substance has touched the L+ terminal, and the operations for the abnormal state are performed at Steps 507 and 508.

In case no abnormal state is judged at Step 516, the routine advances to Step 517, at which the full charge is detected. In the full charge detection according to the constant-current control method, as well known in the art, there are the various method including the –Δ detection method, the second order differential detection method, the ΔT detection method and the ΔT/Δt detection method, one or more of which may be used.

In case the battery pack 301' judges (the answer of Step 517: Yes) the full charge, the micom 315 outputs the charge stopping signal to the switching control circuit 305 to turn OFF the switching element 304 thereby to stop the charge (at Step 513). Next, it is judged (at Step 514) whether or not the battery pack 301' has been removed from the charging device 300. In case the battery pack 301' has been removed, the routine returns to Step 501.

As has been described hereinbefore, the migration of the foreign substance into the charging device is monitored at all times from the ON of the power source so that the trouble such as the short-circuit of the electric circuit can be prevented in advance. This trouble preventing effect is further improved in the structure, in which the charging device is filled up with the resin. The trouble in the structure having no filled resin can also be prevented because the migration of the foreign substance is monitored at all times. Moreover, it is possible to provide the charging device, which is made inexpensive and light by reducing the cost for and the weight of the resin.

Moreover, the invention has been described on the case, in which the abnormal detecting circuit is disposed in the plug-in port. Better countermeasures can be made by disposing the abnormal detecting circuit in an opening such as the intake port or the discharge port of the air.

What is claimed is:

1. A charging device for charging different kinds of battery packs, each battery pack having one or more cells, the charging device comprising:
abnormal detecting means for detecting that an electrically conductive foreign substance has either migrated into the charging device or contacted with the connection terminals of the charging device and the battery pack; and
control means responding to a detection signal of said abnormal detecting means for controlling the charge of said battery pack,
wherein the abnormal detecting means comprises:
first battery temperature detecting means for detecting a temperature of a first kind of battery pack; and
second battery temperature detecting means for detecting a temperature of a second kind of battery pack, and
wherein the control means judges the abnormal state based on signals respectively coming from said first and second battery temperature detecting means and controls the charge of said battery pack based on said signals.

2. A charging device as set forth in claim 1, comprising:
connection detecting means for detecting the connection of the battery pack, wherein said control means leaves the charge unstarted, when said control means judges the antecedence to the connection of the battery pack on the basis of output of said connection detecting means and when said control means judges the migration of foreign substance on the basis of said abnormal detecting means.

3. A charging device as set forth in claim 1, comprising:
connection detecting means for detecting the connection of the battery pack, wherein said control means stops the charge, when said control means judges that migration of a foreign substance on the basis of the output of said connection detecting means, after said control means judges the connection of the battery pack on the basis of the output of said connection detecting means and starts the charge.

4. A charging device as set forth in claim 1, comprising:
informing means for informing an abnormal state in case said control means judges the migration of the foreign substance on the basis of said abnormal detecting means.

5. A charging device as set forth in claim 1, comprising:
a battery pack connecting portion having a terminal group to be connected with a battery pack terminal group,
wherein said abnormal detecting means is disposed in proximity of said battery pack connecting portion.

6. A charging device as set forth in claim 1, comprising:
an intake port for taking the air; and a vent port for feeding said air to the battery pack,
wherein said abnormal detecting means is disposed in proximity of at least one of said intake port and said vent port.

7. A charging device as set forth in claim 1,
wherein said control means judges the abnormal state, when the signals from said first and second battery temperature detecting means vary.

8. A charging device as set forth in claim 1,
wherein the charging device is configured as power source for a portable device.

9. A charging device as set forth in claim 1,
wherein the charging device is configured as power source for a cordless electric tool.

* * * * *